(12) United States Patent
Nechitailo et al.

(10) Patent No.: US 6,654,526 B2
(45) Date of Patent: Nov. 25, 2003

(54) USE OF WATER SWELLABLE YARNS AND PARTICLES IN GEL COMPOUND-FILLED BUFFER TUBES AND UNIRIBBON FIBER OPTIC CABLES

(75) Inventors: Nicholas V. Nechitailo, Conover, NC (US); Brian Risch, Hickory, NC (US); Michael Rossi, Maiden, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/012,541

(22) Filed: Dec. 12, 2001

(65) Prior Publication Data
US 2003/0108310 A1 Jun. 12, 2003

(51) Int. Cl.⁷ ................................................. G02B 6/44
(52) U.S. Cl. ..................................................... 385/109
(58) Field of Search ............................... 385/100, 107, 385/109, 110, 111, 112, 113

(56) References Cited

U.S. PATENT DOCUMENTS

| | | |
|---|---|---|
| 4,324,453 A | 4/1982 | Patel |
| 4,839,970 A | 6/1989 | Goetze et al. |
| 5,157,752 A | 10/1992 | Greveling et al. |
| 5,218,011 A | 6/1993 | Freeman |
| 5,295,215 A | 3/1994 | Federoff et al. |
| 5,384,880 A | 1/1995 | Keller et al. |
| 5,509,097 A * | 4/1996 | Tondi-Resta et al. ....... 385/113 |
| 5,621,841 A | 4/1997 | Field |
| 5,630,003 A | 5/1997 | Arroyo |
| 5,684,904 A | 11/1997 | Bringuier et al. |
| 5,689,601 A | 11/1997 | Hager et al. |
| 5,698,615 A | 12/1997 | Polle |
| 5,838,863 A | 11/1998 | Fujiura et al. |
| 5,905,833 A | 5/1999 | Shue |
| 6,085,009 A | 7/2000 | Risch et al. |
| 6,122,424 A | 9/2000 | Bringuier |
| 6,167,180 A | 12/2000 | Keller |
| 6,178,278 B1 | 1/2001 | Keller et al. |
| 6,236,789 B1 * | 5/2001 | Fitz ........................... 385/101 |

FOREIGN PATENT DOCUMENTS

| | | |
|---|---|---|
| GB | 1 535 840 | 12/1978 |
| WO | WO 88/10000 | 12/1988 |

* cited by examiner

*Primary Examiner*—Javaid H. Nasri
(74) *Attorney, Agent, or Firm*—Sughrue Mion, PLLC

(57) ABSTRACT

A fiber optic buffer tube containing fiber optic ribbons centrally located within the buffer tube and a gel compound surrounding the fiber optic ribbons. Disposed within the gel compound, between the walls of the buffer tube and the fiber optic ribbons are water swellable yarns and/or particles. The water swellable yarns and/or particles volumetrically expand when in contact with water that has penetrated the buffer tube. The water swellable yarns/particles also provide greater surface area which helps to hold gel compound, at elevated temperature, within the tube and thus to prevent the fiber optic ribbons from coming into contact with the walls of the buffer tube, thereby preventing signal attenuation problems.

37 Claims, 11 Drawing Sheets

USE OF WATER SWELLABLE YARNS AND PARTICLES IN GEL COMPOUND-FILLED BUFFER TUBES AND UNIRIBBON FIBER OPTIC CABLES

BACKGROUND OF THE INVENTION

1. Field of the Invention

The present invention relates generally to gel compounds within conduits or buffer tubes and more specifically to the reduction of dripping of the gel compounds at higher temperatures while providing additional protection to optical fibers from water penetration.

2. Description of Related Art

Fiber optic cables have been used by the telecommunications industry for a number of years to transmit information at very high rates over long distances. Fiber optic cables come in a variety of configurations, including: cables with a centrally located single buffer tube containing one or more optical fibers; cables with a plurality of buffer tubes stranded in a helical or alternating helical arrangement about a central strength member; and cables with slotted cores in which a plurality of optical fibers reside.

The buffer tubes within the ribbon cable generally contain one or more fiber optic ribbons centrally located within the buffer tube and a gel compound surrounding the optical fiber ribbons. An example of this can be seen in FIGS. 1–4. As shown in these figures, the fiber optic ribbons 3 are centrally located within buffer tube 1. As can be further seen from FIGS. 1–4, a gel compound 2 surrounds the fiber optic ribbons 3. The gel compound 2 serves a number of purposes. One purpose is to provide a cushioning media between the buffer tube 1 and the fiber optic ribbons 3 to thereby prevent the fiber optic ribbons 3 from contacting the sides of the buffer tube 1. The cushioning media dissipates radial crushing force and in addition, the gel compound 2 provides delayed motion response to the fibers under scanning bending loads. Such loads occur during the installation, when cables are pulled around the corners of the ducts or over the sheaves. The same applies to the earlier stages of manufacture when buffer tube 1 is bent over the sheaves and radially compressed by caterpillars. The artificial increase in the inertia of the ribbons 3 is provided by the viscous gel media and results in time delay for fibers to accommodate the load and to move slower than in a non-gel media toward the tube walls 1. When the fiber optic ribbons 3 contact the sides of the buffer tube 1, signal attenuation problems occur due to micro-bending and high stress. The gel compound 2 also serves to prevent exterior items from coming into contact with the fiber optic ribbons 3 if the buffer tube 1 is penetrated. For example, the gel compound 2 protects the fiber optic ribbons 3 from water that might penetrate the buffer tube 1.

Several problems occur in these conventional buffer tubes, especially ones in which the buffer tube 1 diameter is large (for example, greater than 0.310 inches). First, when the temperature of the gel compound 2 increases, the viscosity and yield stress of the gel compound 2 decreases. If the yield stress of the gel compound 2 decreases below a critical value, the gel compound 2 may begin to flow. For example, if the buffer tube 1 is physically positioned in a vertical manner, as shown in FIG. 5, and the buffer tube 1 is heated, the gel compound 2 within the buffer tube 1 may begin to flow towards the bottom of the buffer tube 1, leaving a cavity 4.

In more detail, as the temperature of the buffer tube 1 increases, the buffer tube 1 expands, thereby increasing the diameter and length of the buffer tube 1, according to the difference between the coefficient of thermal expansion ("CTE") of the buffer tube material 1 and gel compound 2. As for the gel compound 2, as noted above, as its temperature increases, the viscosity and yield stress of the gel compound 2 decreases. As shown in FIG. 5, gravity provides a downward force to the gel compound 2 while frictional forces (F1 and F2) with the tube wall are transmitted through the material by the yield stress of the gel compound 2. Friction between the gel compound 2 and the buffer tube 1 is labeled F1 while the fiction between the gel compound 2 and the fiber optic ribbons 3 is labeled F2. Consequently, as the temperature of the gel compound 2 increases, the yield stress of the gel compound 2 decreases and the ability of the gel to transmit friction forces F1 and F1 through the gel compound 2 decreases. Since the downward force of gravity remains constant during an increase in temperature of the gel compound 2, when the temperature of the gel compound 2 increases, the downward force of gravity on the material becomes greater than the upward force that can be transmitted through the material through the yield stress of the gel compound 2. As a result, the gel compound 2 may flow downward.

Once the gel compound 2 "runs away," it does not provide adequate protection to the fiber optic ribbons 3. The fiber optic ribbons 3 tend to contact the buffer tube walls 1, which in turn causes attenuation problems. Therefore, it is an object of the present invention to improve the compound flow performance of gel compound-filled fiber optic cables.

Additionally, gel compound 2 may be "forced" out of the buffer tube 1 when heated due to the difference between the CTE of the buffer tube 1 and the CTE of the gel compound 2. As stated earlier, when heated, both the buffer tube 1 and the gel compound 2 expand according to their respective CTE. If the CTE of the buffer tube 1 is less than the CTE of the gel compound 2, then the gel compound 2 expands more than the buffer tube 1. Since the gel compound 2 is expansionally limited in the radial direction by the buffer tube 1, if the gel compound 2 expands more than the buffer tube 1 when heated, the additional expansion of the gel compound 2 is directed in the axial direction. As a result, gel compound 2 is "forced" out of the ends of the buffer tube 1.

Another problem occurs when the gel compound-filled buffer tubes 1 contain relatively large air bubbles 6. The air bubbles 6 are often formed by the upward movement and coalescence of smaller air bubbles that were not completely removed from the gel compound 2 under vacuum conditions. Additionally, air bubbles 6 can be entrapped in the gel compound 2 during the extrusion of the gel compound 2 and buffer tube 1. In horizontal position, coalesced bubbles 6 form continuous air passages. Air bubbles 6 can significantly ease water penetration and can further help water, that has penetrated the buffer tube 1, to move axially within the buffer tube 1. Exposing optical fiber 3 to water can result in optical fiber deterioration.

Another problem with the conventional buffer tubes is the stability or integrity of the ribbon stack shape under the bending loads. In particular, when the stack twist laylength is long and the tube or cable is bent about a small-radius object, the ribbon stack may collapse. The ribbons 3 may slide sideways and "fall" sideways causing ribbon damage and fiber attenuation. Thus, it is desirable to provide means for holding the stack with initial, typically rectangular shape of its cross section.

SUMMARY OF THE INVENTION

According to one aspect of the invention, optical fibers are provided in a conduit along with water swellable material and a gel compound. In one of the preferred embodiments, the conduit is a buffer tube.

More specifically, the present invention solves the above-described problems and limitations by placing water swellable yarns and/or water absorbing particles within gel compound-filled conduits or the buffer tubes. The water swellable yarns and particles, when in contact with water that has penetrated the buffer tube, begin to swell. As a result, the yarns and particles provide many beneficial effects. First, when water penetrates the buffer tube and comes in contact with the water swellable yarns, the yarns volumetrically expand and fill out the volume taken by the air bubble, as well as break air channels in the horizontally positioned portions of the tubes. Second, the yarns help to compensate for the expansion of the buffer tube walls caused by the increase in temperature by making the expansion and CTE of the gel-yarn system closer to that of the buffer tube material. Finally, the yarns themselves provide surface area for the gel compound to contact which in turn provides additional friction forces that help to keep the gel compound from "flowing" downward.

In a preferred embodiment of the present invention, water swellable yarns having whiskers (increased total surface area) are disposed between the fiber optic ribbon stacks and the walls of the buffer tube. The water swellable yarns vary in size and surround the fiber optic ribbon stacks.

Further objects, features and advantages of the invention will become apparent from a consideration of the following description and the appended claims when taken in connection with the accompanying drawings.

BRIEF DESCRIPTION OF THE DRAWINGS

The above aspects of the present invention will become more apparent by describing in detail embodiments thereof with reference to the attached drawings, in which.

DETAILED DESCRIPTION OF THE PREFERRED EMBODIMENTS

Hereinafter, embodiments of the present invention will be described in detail with reference to the attached drawings.

The present invention is not restricted to the following embodiments, and many variations are possible within the spirit and scope of the present invention. The embodiments of the present invention are provided in order to more completely explain the present invention to one skilled in the art.

Figure 1:
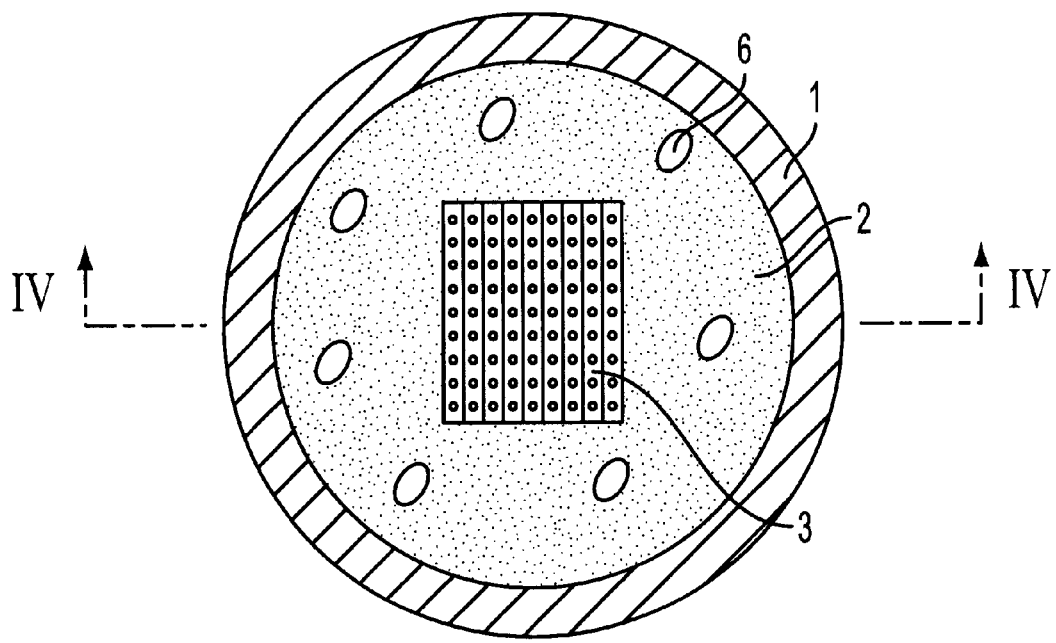
FIG. 1 is a plan view of a conventional buffer tube.
Figure 2:
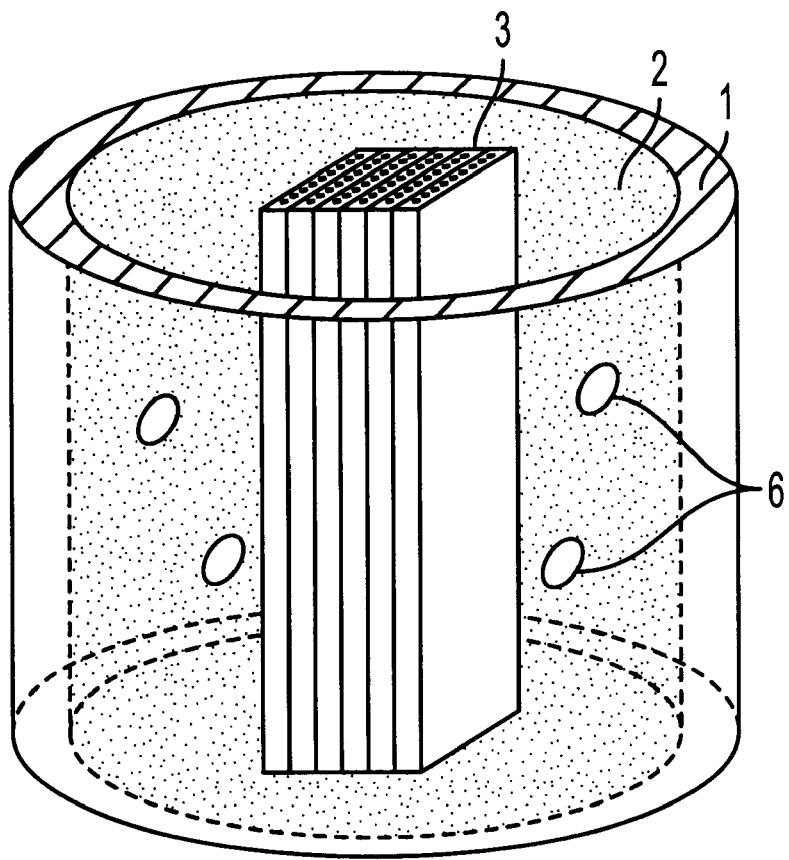
FIG. 2 is a side view of a conventional buffer tube with a transparent front of the buffer tube.
Figure 3:
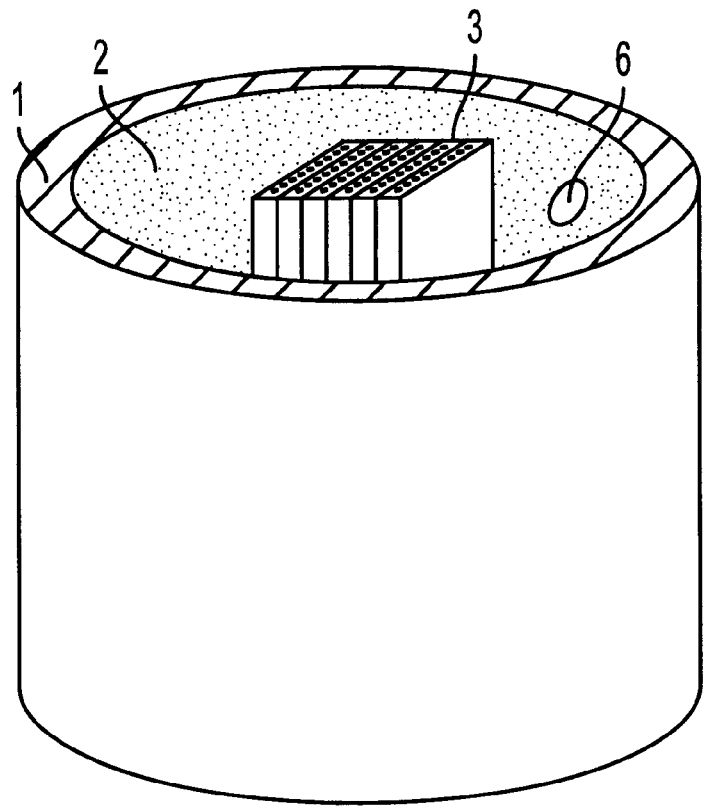
FIG. 3 is a side view of a conventional buffer tube.
Figure 4:
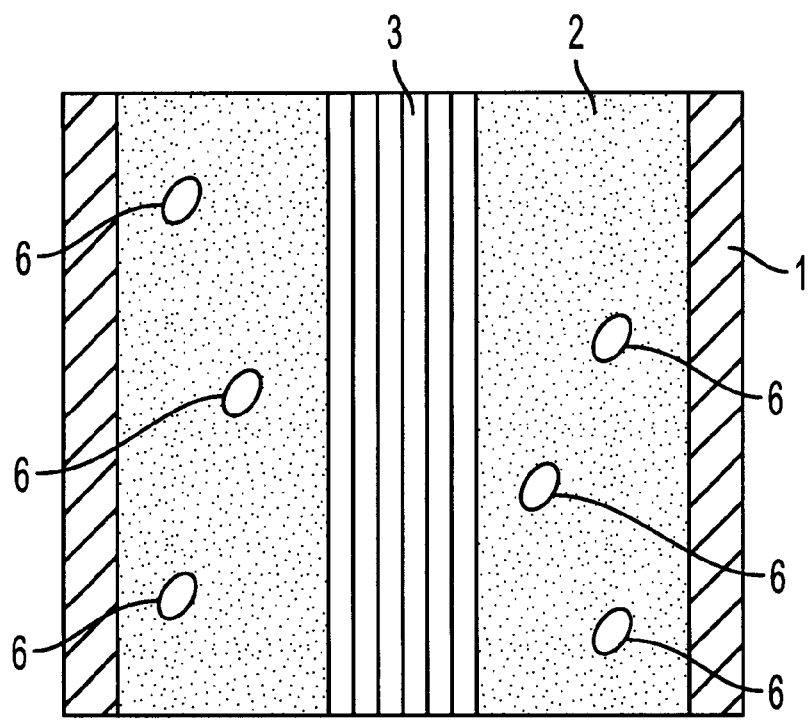
FIG. 4 is a side view of a conventional buffer tube taken along the IV—IV line of FIG. 1.
Figure 5:
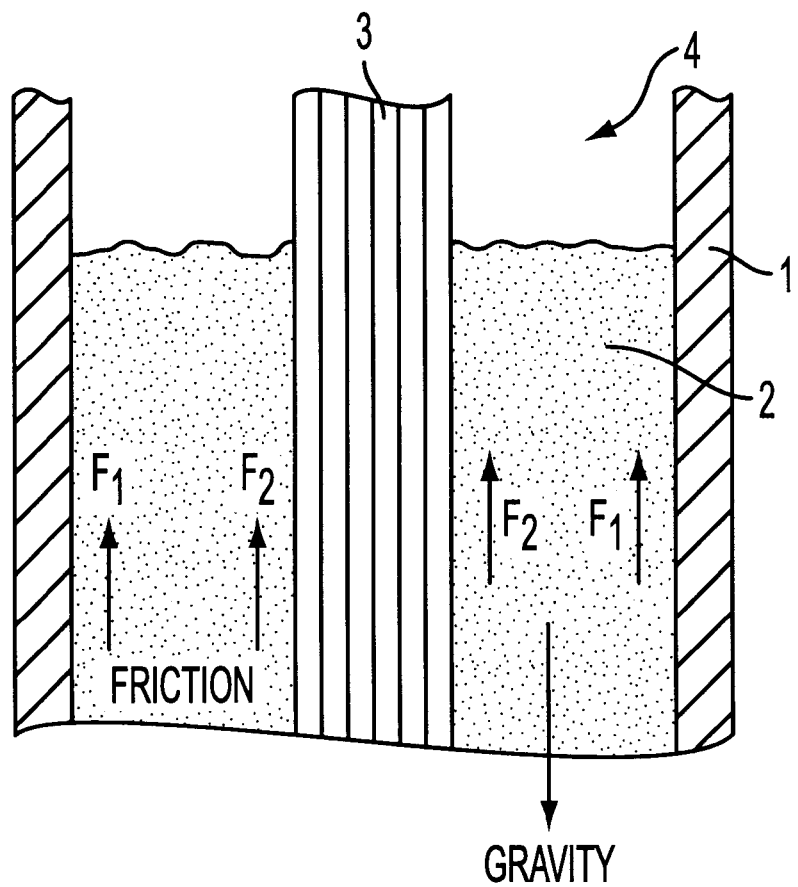
FIG. 5 is side view of a conventional buffer tube taken along the IV—IV line of FIG. 1 showing the forces acting on the gel compound when the temperature of the buffer tube is increased.
Figure 6:
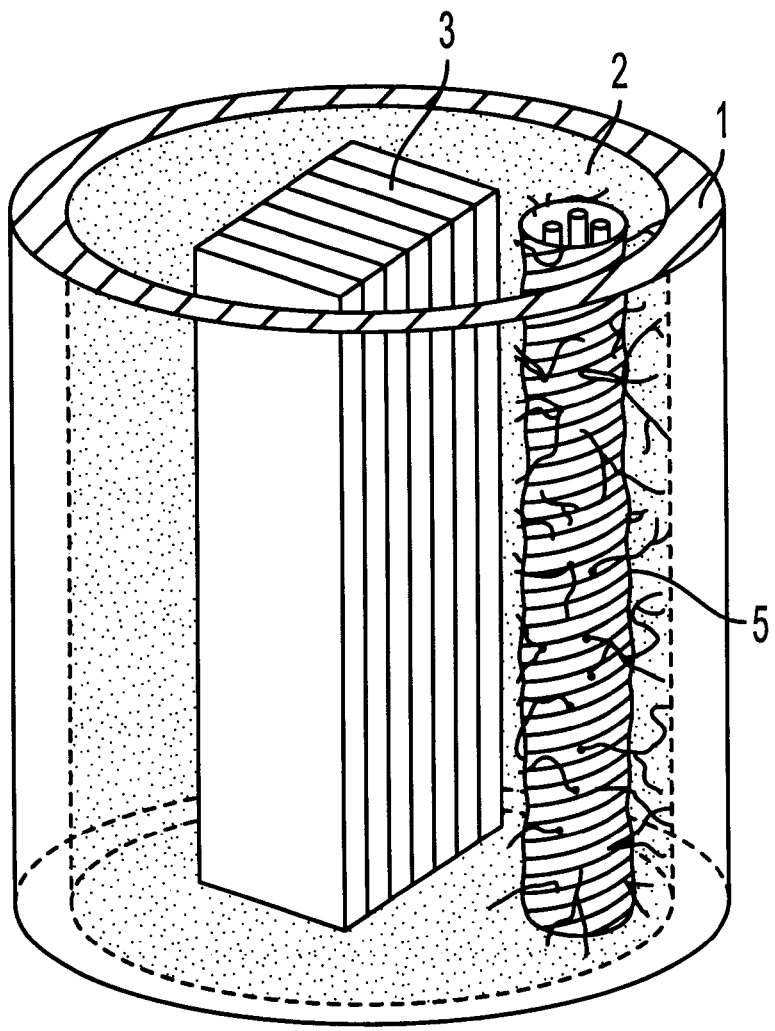
FIG. 6 is a perspective view of a buffer tube according to a preferred embodiment of the present invention.

Referring to FIG. 6, the present invention solves many of the problems created when a buffer tube 1 containing a single ribbon or single stack of ribbons 3 centrally located and surrounded by gel compound 2, is penetrated by water. The buffer tube 1 can be made of any type material and can be any shape or size. Generally, the buffer tube 1 is cylindrical in shape. The fiber optic ribbons 3 can be assembled in stacks (as shown) or can be individual if necessary. The gel compound 2 is also not limited in any manner.

Figure 8:
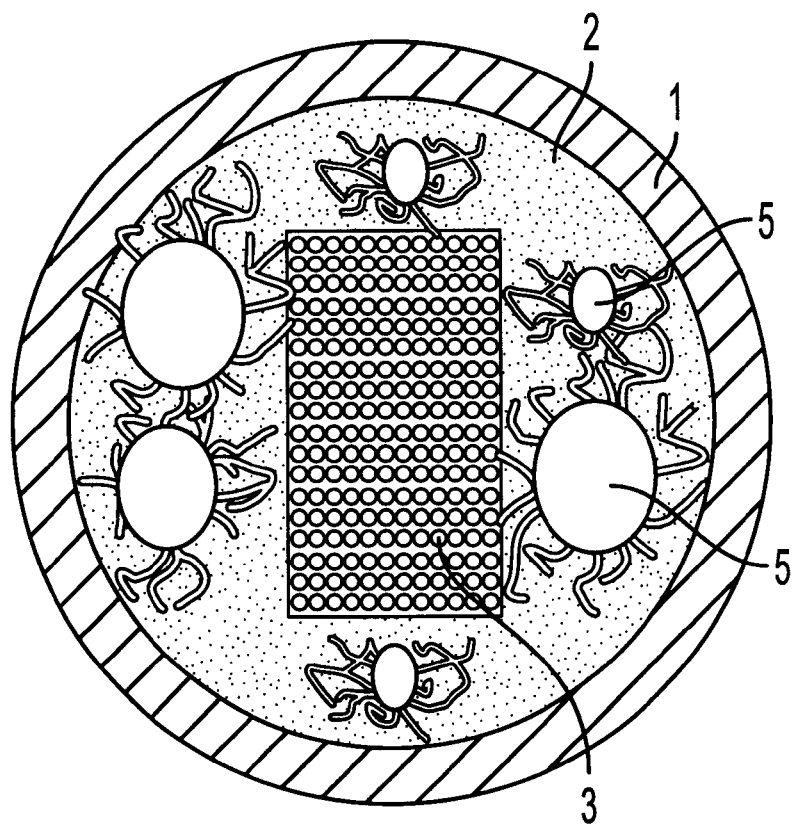
FIG. 8 is an overhead view of the buffer tube of FIG. 6.
Figure 9:
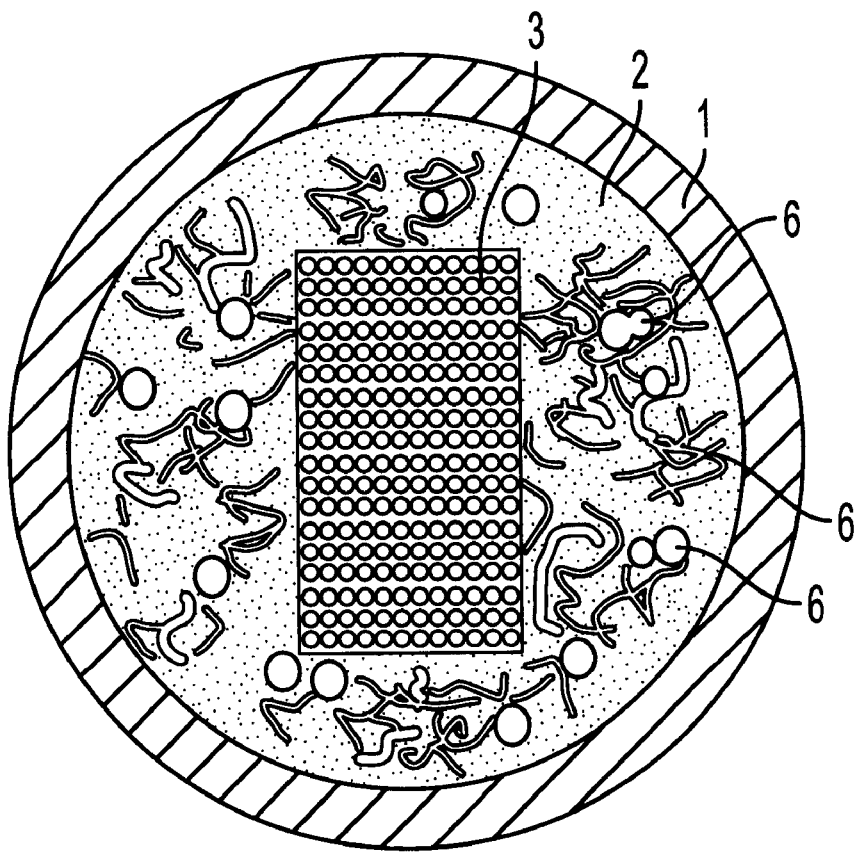
FIG. 9 is an overhead view of another embodiment of the present invention when water swellable particles are embedded in the gel compound.
Figure 10:
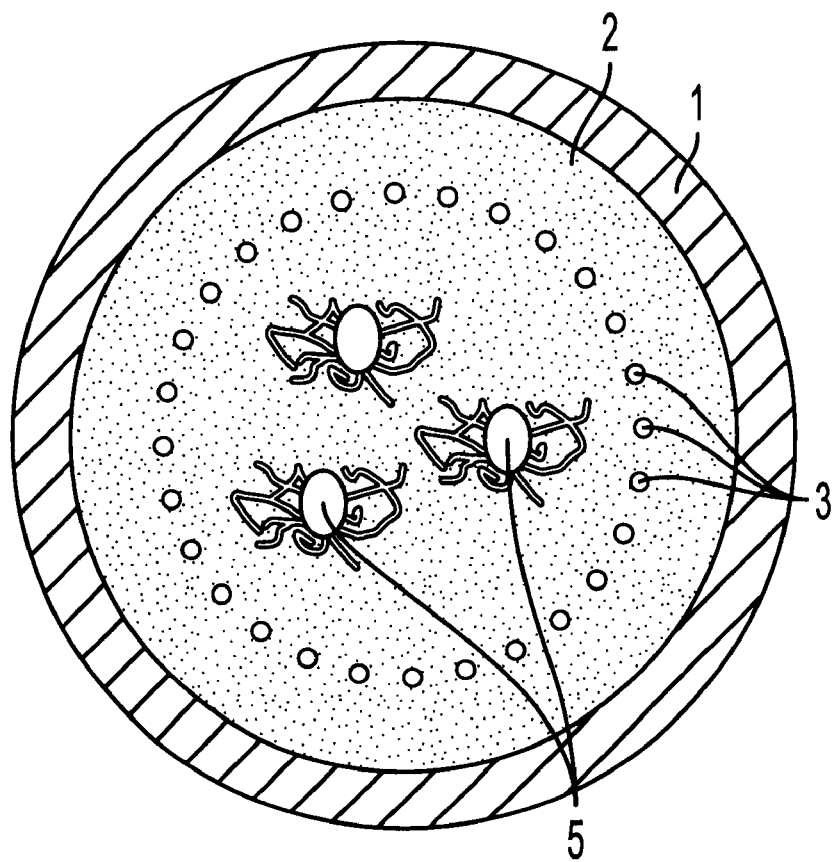
FIG. 10 is a plan view of a buffer tube of the present invention having optical fibers circumferentially arranged within the buffer tube.
Figure 11:
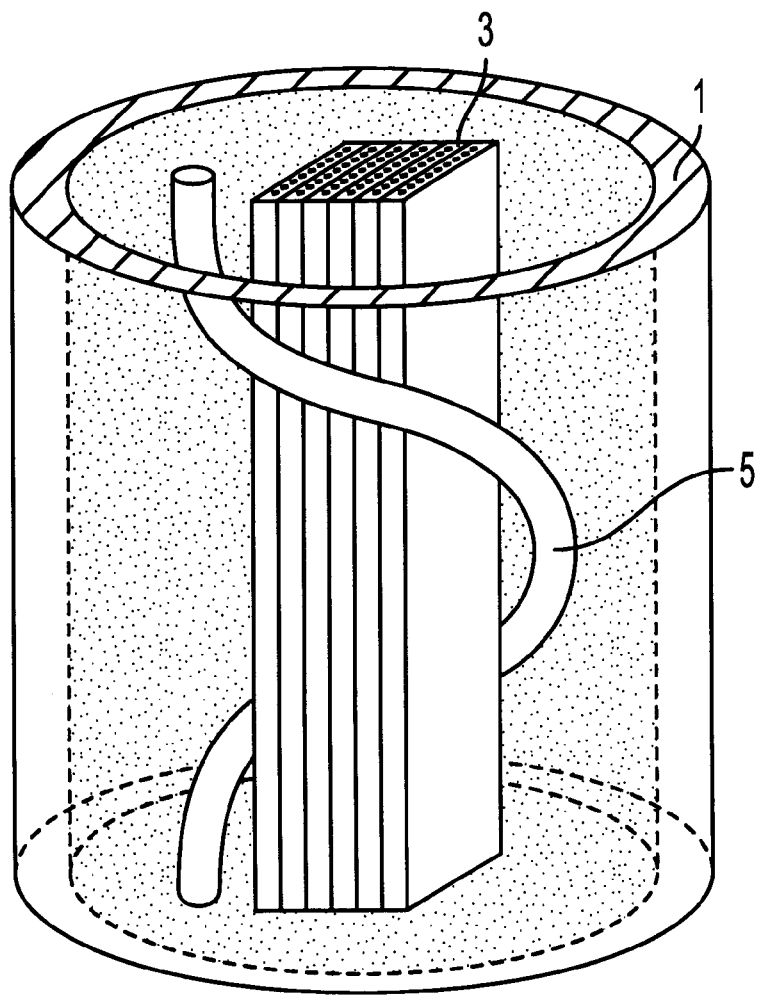
FIG. 11 is a perspective view of a buffer tube of the present invention having a yarn helically disposed around optical fibers.

The present invention, as shown in FIGS. 6 and 9, embeds water swellable yarns 5 and/or particles 6 in the gel compound 2, between the walls of the buffer tube 1 and the fiber optic ribbon stack 3. The water swellable yarns 5 can be disposed in a number of ways. For example, the water swellable yarns 5 can run axially parallel to the fiber optic ribbon 3 or even be wrapped around the fiber optic ribbon 3 in a helical manner. In this case, the yarns 5 will provide the stability of the ribbon stack under bending conditions. The water swellable yarns 5 do not have to be evenly dispersed within the buffer tube 1. For example, the water swellable yarns 5 can be places closer to the buffer tube walls 1 than to the fiber-optic ribbons 3. Although FIG. 6 shows only one water swellable yarn 5, any number of yarns can be used. As shown in FIG. 8, the size and shape of the yarns can vary as well as the type. For example, although the figures show the yarns 5 with whiskers, the present invention can be practiced using water swellable yarns 5 with and/or without whiskers. Water swellable yarns 5 can also be replaced by any other material that volumetrically expands when in contact with water.

Figure 7:
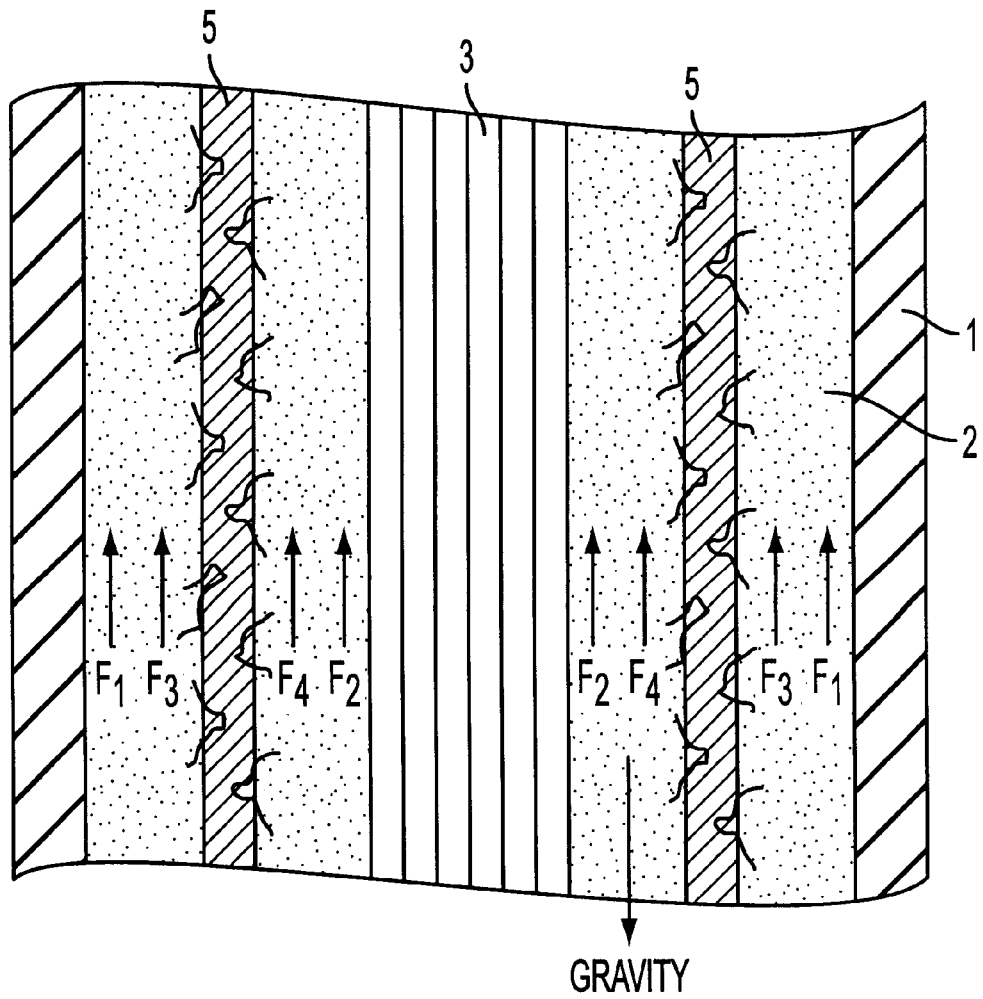
FIG. 7 is a side view of the buffer tube of FIG. 6 showing the forces acting on the gel compound when water swellable yarns are embedded in the gel compound.

As described earlier, a first problem arises when the buffer tube 1 and gel compound 2 become heated. By adding the water swellable yarns 5, the problem of the gel compound 2 "running" downward can be diminished. As shown in FIG. 7, adding water swellable yarns 5 and/or particles 6 to the buffer tube 1 results in two additional upward forces F3, F4 that help prevent the gel compound 2 from running downward.

More specifically, the addition of the water swellable yarns 5 increases the amount of surface area with which the gel compound 2 may contact. The additional surface area results in two additional forces F3, F4 that act upon the gel compound 2. As a result, more upward forces act upon the gel compound 2 to help compensate for any decrease in force caused by the decrease in viscosity of the gel compound 2 when the temperature is increased.

Additionally, by selecting water swellable yarn 5 and/or particles 6 having a CTE which is less than the CTE of the gel compound 2, the CTE of the gel-yarn system is lowered. In fact, it is possible to select yarns having a negative CTE (i.e. yarns that volumetrically contract when heated). In a preferred embodiment, yarns 5 and/or particles 6 are selected in such a manner that the resulting CTE of the gel-yarn system matches or is substantially equivalent to the CTE of the buffer tube 1. Consequently, when heated, both the buffer tube 1 and the gel-yarn system expand by the same amount. As a result, gel compound 2 is not "forced" out of the buffer tube 1 in the axial direction.

Also, since the water swellable yarns 5 and/or particles 6 occupy some of the volume inside the buffer tube 1, less gel compound 2 may be consequently used. Using less gel compound 2 results in at least two beneficial effects. First, since gel compound 2 is expensive, using less means the cost of manufacturing the fiber optic cable is decreased. Second, since the force acting in the downward direction (i.e. gravity) is a function of the mass of the gel compound 2, replacing some of the gel compound 2 with water swellable yarns having less mass than the gel compound 2 decreases the downward force due to gravity. A decrease in the force of gravity means that less upward force (i.e. friction forces F1, F2, F3, and F4) is needed to keep the gel compound 2 from running down the fibers. When the gel compound 2 is held in place, it prevents the fiber optic ribbons 3 from contacting the walls of the buffer tube 1 and also prevents other materials (i.e. water) that might penetrate the buffer tube 1 from contacting the fiber optic ribbons 3.

A second problem occurs when air bubbles 6 are entrapped in the gel compound 2. However, the air bubbles 6 are reduced by embedding water swellable yarns 5 in the gel compound 2. When water penetrates the buffer tube 1, and comes in contact with the water swellable yarns 5, the water swellable yarns 5 volumetrically expand. This expansion "pushes" the gel compound 2 towards both the buffer tube walls 1 and the fiber optic ribbon stack 3. Since the total volume within the buffer tube 1 is fixed, an increase in volume of water swellable yarns forces a decrease in the volume of the air bubbles 6. If enough water contacts the water swellable yarns 5, its volume will have expanded such that the air bubbles 6 can be effectively eliminated.

As shown in FIGS. 8 and 9, the water swellable yarns 5 of the present invention can be oriented in a number of ways. Water swellable yarns are commercially available and manufactured by such companies as FiberLine and Lantor, Inc. The number, size and type of the strands of yarn used can also vary. Super absorbent powders and water-blocking super-absorbent polymers are currently well developed for many applications including medical, baby care and cable sectors. These are available from several manufacturers including Scapa Polymerics. Mixing the powders 6 with gel compound will result in a gel impregnated with super-absorbent polymers with tailorable concentration, properties and performance.

For example, in one embodiment, there may be three strands of yarns disposed within the buffer tube 1 with each of the three strands being a different size. Further, two of the strands may be oriented axially parallel to the fiber optic ribbons 3 while the remaining strand may be disposed helically around the fiber optic ribbons 3. The yarns 5 in a preferred embodiment have whiskers, however, the present invention may be practiced with yarns 5 that do not have whiskers. The yarns 5 with whiskers may also be used to "drag" the gel compound 2 into the buffer tube 1 which speeds manufacturing of the buffer tubes 1. Finally, the present invention is not limited to only water swellable yarns. Other materials may be used proved they volumetrically expand when contacted by water.

The buffer tubes of the present invention can be made in a number of ways. Typically, an assembled stack of fiber ribbons is pulled through a die. Gel compound is injected in the die (from the inside) and a hot thermoplastic material is extruded over the gel-stack system (from the outside) to form a buffer tube with gel compound and ribbons inside. The buffer tube is then moved through a water-cooling channel and wound on the reel. In a preferred embodiment, the water swellable yarns 5 are pulled with the assembled stack of fiber ribbons through the die and the water swellable particles 6 are embedded in the gel compound prior to extruding the gel compound.

The yarns most likely will be applied during the buffering/stranding process of the ribbon buffer tubes. The yarns are wound onto a delivery spool and then delivered along with the other optical units into the tube while the polymer is being extruded. That is, ribbons are "stranded" and then "buffered" usually in a single process step. These terms, (stranded and buffered) are commonly used for manufacturing optical units in the industry. The advantages to this are 1) being able to control yarn tensions (which are critical to maintain desired stack integrity) and 2) applying them in the "stacks" "final" formation just prior to entering the buffer tube. Also, it allows you to apply them in the desired helical formation of the "stack". The "stack" can then orient itself in an ideal center position-cushions will help to center the stack within the polymer tube, which can prevent attenuation degradation due to the potential for the optical units to engage the tube wall.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A fiber optic buffer tube comprising:
    at least one optical fiber having a coefficient of thermal expansion disposed within said buffer tube;
    gel compound having a coefficient of thermal expansion disposed within said buffer tube, wherein said gel compound is disposed between said at least one optical fiber and said buffer tube; and
    at least one water swellable material having a coefficient of thermal expansion disposed within said buffer tube, wherein said at least one water swellable material contacts said gel compound in a non-water penetrating state;
    wherein the coefficient of thermal expansion of said at least one water swellable material is less than the coefficient of thermal expansion of said buffer tube.

2. The fiber optic buffer tube of claim 1, wherein said at least one optical fiber is circumferentially arranged within said buffer tube.

3. The fiber optic buffer tube of claim 1, wherein said at least one water swellable material is water swellable yarn.

4. The fiber optic buffer tube of claim 3, wherein said water swellable yarn has whiskers.

5. The fiber optic buffer tube of claim 3, wherein said water swellable yarn is arranged axially parallel to said at least one optical fiber.

6. The fiber optic buffer tube of claim 3, wherein said water swellable yarn is helically disposed around said at least one optical fiber.

7. The fiber optic buffer tube of claim 1, wherein said at least one water swellable material is water swellable particles.

8. The fiber optic buffer tube of claim 1, wherein said at least one water swellable material included a first type water swellable material and a second type water swellable material; and
    wherein said first type water swellable material is different than said second type water swellable material.

9. The fiber optic buffer tube of claim 1, wherein said at least one optical fiber is a fiber optic ribbon.

10. The fiber optic buffer tube of claim 1, wherein said at least one optical fiber is a bundle of optical fibers.

11. The fiber optic buffer tube of claim 1, wherein said at least one water swellable material volumetrically expands when heated.

12. A fiber optic buffer tube comprising:
at least one optical fiber having a coefficient of thermal expansion disposed within said buffer tube;
gel compound having a coefficient of thermal expansion disposed within said buffer tube, wherein said gel compound is disposed between said at least one optical fiber and said buffer tube; and
at least one water swellable material having a coefficient of thermal expansion disposed within said buffer tube; and
wherein said at least one water swellable material volumetrically contracts when heated.

13. A fiber optic buffer tube comprising:
at least one optical fiber having a coefficient of thermal expansion disposed within said buffer tube;
gel compound having a coefficient of thermal expansion disposed within said buffer tube, wherein said gel compound is disposed between said at least one optical fiber and said buffer tube; and
at least one water swellable material having a coefficient of thermal expansion disposed within said buffer tube, and
wherein the coefficient of thermal expansion of said at least one water swellable material is less than the coefficient of thermal expansion of said gel compound.

14. A fiber optic buffer tube comprising:
at least one optical fiber having a coefficient of thermal expansion disposed within said buffer tube;
gel compound having a coefficient of thermal expansion disposed within said buffer tube, wherein said gel compound is disposed between said at least one optical fiber and said buffer tube; and
at least one water swellable material having a coefficient of thermal expansion disposed within said buffer tube; and
wherein the coefficient of thermal expansion of said at least one water swellable material is less than the coefficient of thermal expansion of said buffer tube.

15. A fiber optic buffer tube comprising:
at least one optical fiber having a coefficient of thermal expansion disposed within said buffer tube;
gel compound having a coefficient of thermal expansion disposed within said buffer tube, wherein said gel compound is disposed between said at least one optical fiber and said buffer tube; and
at least one water swellable material having a coefficient of thermal expansion disposed within said buffer tube; and
wherein said gel compound and said at least one water swellable material form a gel system having a coefficient of thermal expansion, and wherein the coefficient of thermal expansion of said gel system is matched to the coefficient of thermal expansion of said buffer tube.

16. A method of improving gel compound flow performance of a gel compound-filled fiber optic buffer tube having a coefficient of thermal expansion and having at least one optical fiber, comprising:
embedding at least one water swellable material having a coefficient of thermal expansion within said buffer tube; wherein said gel compound having a coefficient of thermal expansion; and
wherein the coefficient of thermal expansion of said at least one water swellable material is less than the coefficient of thermal expansion of said buffer tube.

17. The method of improving gel compound flow performance of a gel compound-filled fiber optic buffer tube having a coefficient of thermal expansion and having at least one optical fiber of claim 16, wherein said at least one optical fiber is circumferentially arranged within said buffer tube.

18. The method of improving gel compound flow performance of a gel compound-filled fiber optic buffer tube having a coefficient of thermal expansion and having at least one optical fiber of claim 16, wherein said at least one water swellable material is water swellable yarn.

19. The method of improving gel compound flow performance of a gel compound-filled fiber optic buffer tube having a coefficient of thermal expansion and having at least one optical fiber of claim 18, wherein said water swellable yarn has whiskers.

20. The method of improving gel compound flow performance of a gel compound-filled fiber optic buffer tube having a coefficient of thermal expansion and having at least one optical fiber of claim 18, wherein said water swellable yarn is arranged axially parallel to said at least one optical fiber.

21. The method of improving gel compound flow performance of a gel compound-filled fiber optic buffer tube having a coefficient of thermal expansion and having at least one optical fiber of claim 18, wherein said water swellable yarn is helically disposed around said at least one optical fiber.

22. The method of improving gel compound flow performance of a gel compound-filled fiber optic buffer tube having a coefficient of thermal expansion and having at least one optical fiber of claim 16, wherein said at least one water swellable material is water swellable particles.

23. The method of improving gel compound flow performance of a gel compound-filled fiber optic buffer tube having a coefficient of thermal expansion and having at least one optical fiber of claim 16, wherein said at least one water swellable material includes a first type water swellable material and a second type water swellable material; and
wherein said first type water swellable material is different than said second type water swellable material.

24. The method of improving gel compound flow performance of a gel compound-filled fiber optic buffer tube having a coefficient of thermal expansion and having at least one optical fiber of claim 16, wherein said at least one water swellable material volumetrically expands when heated.

25. The method of improving gel compound flow performance of a gel compound-filled fiber optic buffer tube having a coefficient of thermal expansion and having at least one optical fiber of claim 16, wherein said at least one water swellable material volumetrically contracts when heated.

26. The method of improving gel compound flow performance of a gel compound-filled fiber optic buffer tube having a coefficient of thermal expansion and having at least one optical fiber of claim 16, wherein the coefficient of thermal expansion of said at least one water swellable material is less than the coefficient of thermal expansion of said gel compound.

27. The method of improving gel compound flow performance of a gel compound-filled fiber optic buffer tube having a coefficient of thermal expansion and having at least one optical fiber of claim 16, wherein said gel compound and said at least one water swellable material form a gel system having a coefficient of thermal expansion, and wherein the coefficient of thermal expansion of said gel system is matched to the coefficient of thermal expansion of said buffer tube.

28. A method of forming an optical fiber member comprising the following steps:

provding at least one optical fiber having a coefficient of thermal expansion;

providing a gel compound having a coefficient of thermal expansion along said optical fiber;

providing at least one water swellable material having a coefficient of thermal expansion along said optical fiber; and forming a conduit around said optical fiber, said gel compound, and said water swellable material such that when water that penetrates said conduit contacts said water swellable material, said water swellable material expands volumetrically within said conduit;

wherein the coefficient of thermal expansion of said at least one water swellable material is less than the coefficient of thermal expansion of said buffer tube.

29. The method of forming an optical fiber member of claim 28, wherein said at least one water swellable material volumetrically contracts when heated.

30. The method of forming an optical fiber member of claim 28, wherein said water swellable material has whiskers.

31. The method of forming an optical fiber member of claim 30, further comprising:

dragging said gel compound into said conduit using said water swellable material.

32. The method of forming an optical fiber member of claim 31, wherein said water swellable material is water swellable yarn.

33. The method of forming an optical fiber member of claim 28, wherein the coefficient of thermal expansion of said at least one water swellable material is less than the coefficient of thermal expansion of said gel compound.

34. The method of forming an optical fiber member of claim 28, wherein said at least one water swellable material volumetrically expands when heated.

35. The method of forming an optical fiber member of claim 28, wherein said gel compound and said at least one water swellable material form a gel system having a coefficient of thermal expansion, and wherein the coefficient of thermal expansion of said gel system is matched to the coefficient of thermal expansion of said buffer tube.

36. The method of forming an optical fiber member of claim 28, wherein said water swellable material is water swellable particles.

37. The method of forming an optical fiber member of claim 36, wherein said water swellable particles have whiskers.

* * * * *